United States Patent [19]

Smothers

[11] Patent Number: 4,915,555
[45] Date of Patent: Apr. 10, 1990

[54] POWER DRILL HAVING DRILL CHUCK TIGHTENER

[76] Inventor: Clarence W. Smothers, 1202 Kinsley Ave., Pomona, Calif. 91767

[21] Appl. No.: 362,883

[22] Filed: Jun. 7, 1989

[51] Int. Cl.⁴ .............................................. B23B 31/06
[52] U.S. Cl. .................................... 408/240; 279/1 K; 279/60
[58] Field of Search ............... 408/241 R, 240, 239 R; 279/1 K, 60, 61, 62; 81/16

[56] References Cited

U.S. PATENT DOCUMENTS

| | | | |
|---|---|---|---|
| 2,716,555 | 8/1955 | Rowe | 279/1 K |
| 4,317,578 | 3/1982 | Welch | 279/62 |
| 4,389,146 | 6/1983 | Coder | 279/1 K |
| 4,460,296 | 7/1984 | Sivertson, Jr. | 279/1 K |
| 4,752,161 | 6/1988 | Hill . | |
| 4,752,165 | 6/1988 | Wanner . | |

FOREIGN PATENT DOCUMENTS 3527234 2/1987 Fed. Rep. of Germany ..... 279/1 K

Primary Examiner—Daniel Howell
Attorney, Agent, or Firm—Sheldon & Mak

[57] ABSTRACT

A reversible power drill having a drill chuck tightener is disclosed. The drill has a body and chuck reversibly rotatable with respect to the body. The tightener comprises a lever or a contact post attached to the body of the drill and an impact button attached to the back portion of the chuck of the drill wherein the lever or post impacts the impact button as the chuck rotates, thereby tightening or loosening the chuck depending upon the direction of rotation of the drill. The lever or post is biased by a spring into a position which disengages it from the impact button when not in use.

20 Claims, 2 Drawing Sheets

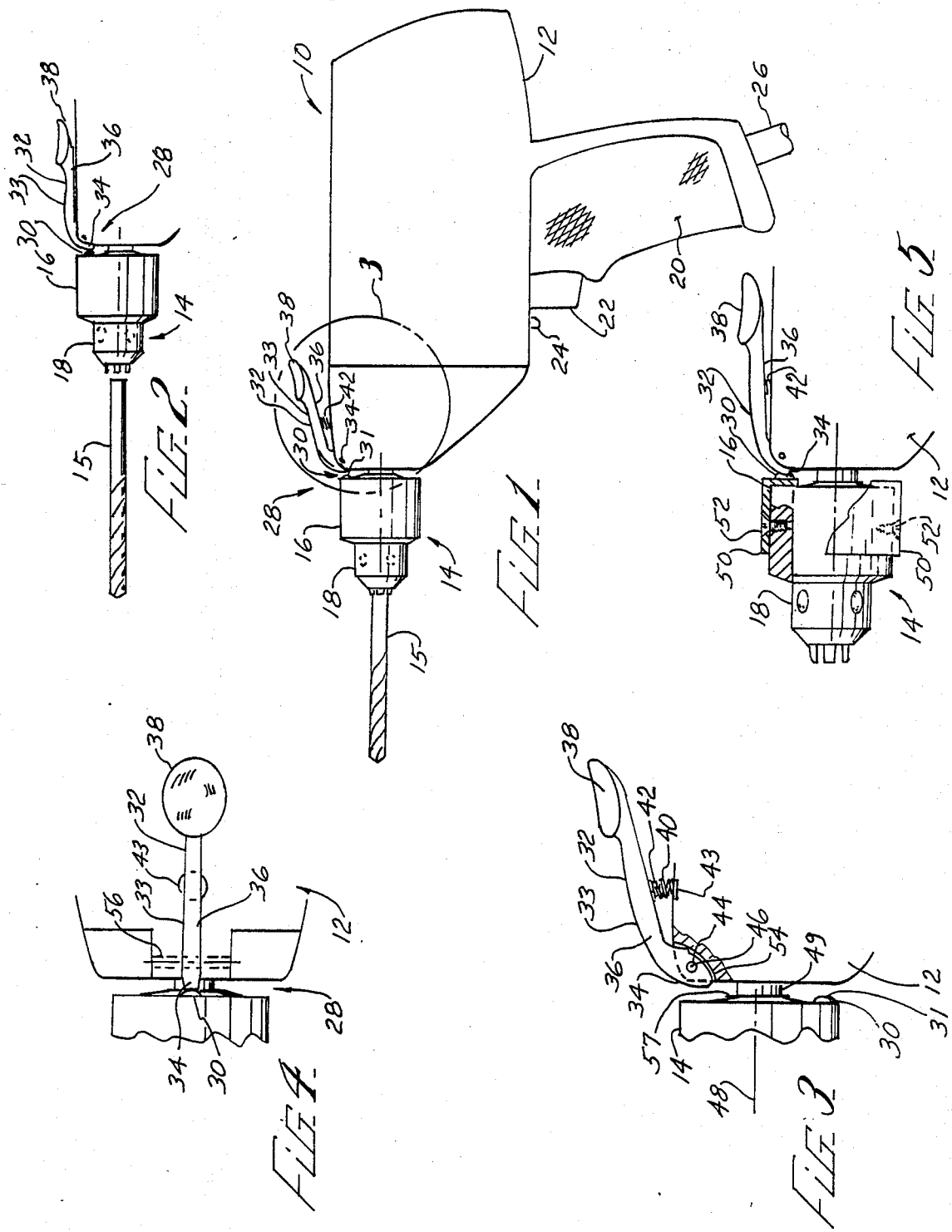

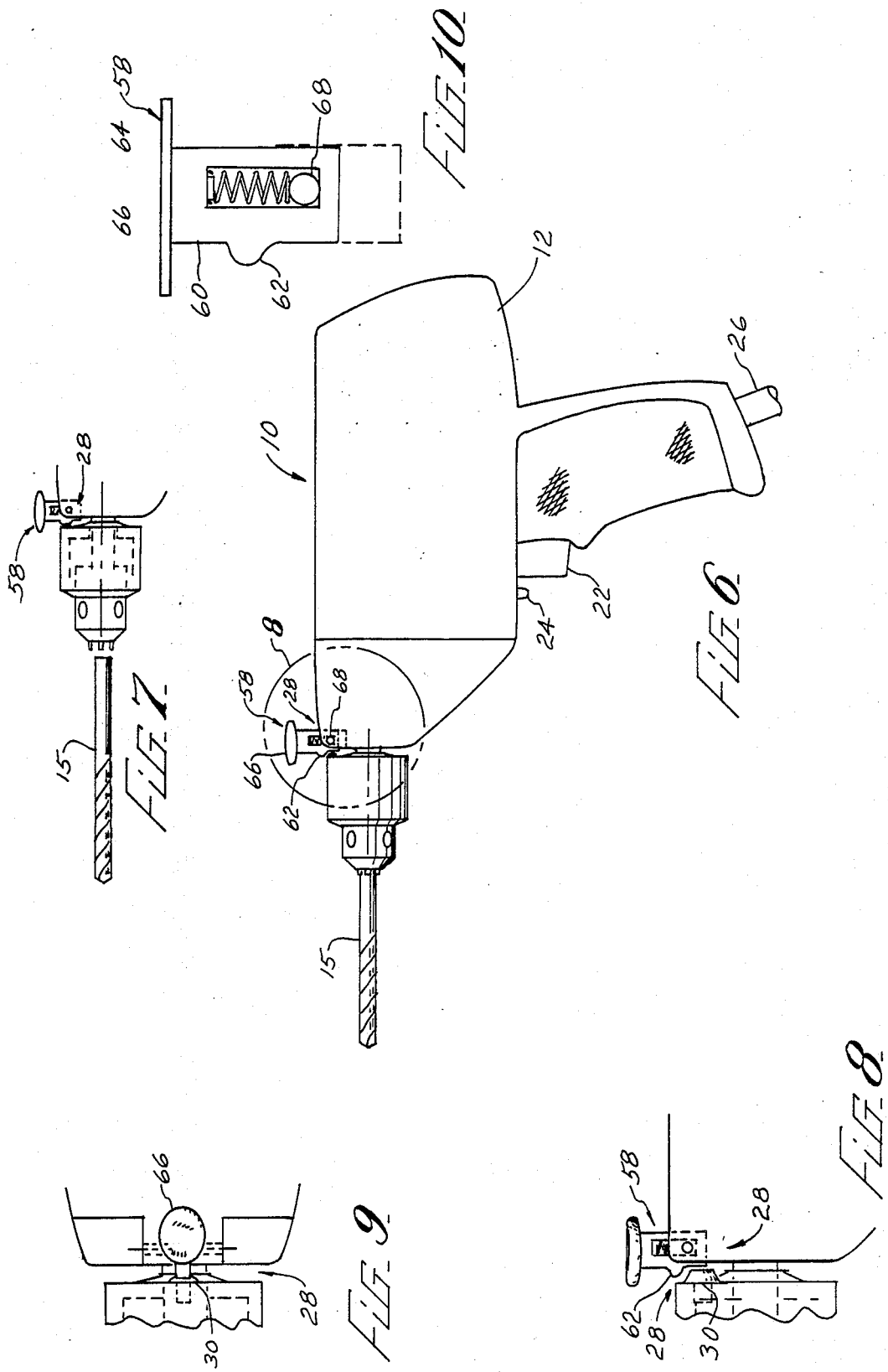

POWER DRILL HAVING DRILL CHUCK TIGHTENER

BACKGROUND

The present invention relates to power drills. More specifically, the present invention relates to a drill chuck tightener for a reversible power drill.

The usual means for tightening a drill bit in a drill chuck is a chuck key. The key mates with the drill chuck to cause an outer sleeve of the chuck to rotate in a direction opposite to the nose of the chuck, thereby tightening the bit in the nose.

Such a key for tightening a drill chuck presents numerous problems. One problem is that the key can be easily lost thereby making adequate tightening of the drill bit extremely difficult. Furthermore, using such a key is awkward. The user of the drill usually holds the drill near the chuck with one hand and tightens the chuck with the key by the other hand. Because most of the weight of the drill is in the body of the drill, the drill is easily dropped as it is being tightened thereby damaging the drill.

Use of such a key can also be painful and frustrating for a person with arthritis or poor eyesight because the key must fit precisely in the chuck. Such a key further requires a substantial amount of hand strength to tighten the chuck properly thus presenting further problems for people with bone, joint, or muscle pain in the hands, such as those suffering from arthritis.

Therefore, there is a need for a means for tightening a drill chuck which is not easily lost, does not result in a substantial risk of dropping the drill, does not require precise movement between two objects, and does not require substantial hand strength.

SUMMARY

The present invention meets this need by providing a chuck tightener apparatus that is integral with a reversible power drill so it is not easily lost. In one aspect of the invention, the apparatus includes braking means that is attached to a tightening sleeve of the chuck, and contact means movably attached to a housing or body of the drill for contacting the braking means in a first position of the contact means, thereby tightening a drill bit in the chuck in a first direction of chuck rotation, or loosening the bit in an opposite second direction of rotation. The contact means has a second position whereby the contact means is disengaged from the braking means.

The contact means can include a hand-operable lever or contact post that can be connected to the body of the drill. Preferably, the lever or post is biased toward the second position for permitting drilling while the lever or post is inactivated. The biasing means can be a helical spring attached between the body of the drill and the lever. The spring biases the lever or post into its second position wherein the lever is disengaged from the braking means. The spring also compresses to allow the lever or post to be in its first position when the lever or post is moved toward the body of the drill.

The braking means is attached to the sleeve for braking the sleeve from rotating with respect to the nose. The contact means is movably attached to the body for contacting the braking means in a first position of the contact means. The contact between the contact means and the braking means causes braking of the sleeve to tighten the drill bit as the chuck rotates in the one direction of rotation. When the chuck of the reversible drill is rotated in the other direction of rotation, the contact results in the braking of the sleeve to loosen the bit. The contact means is restrained from movement in both directions of rotation of the chuck thereby providing resistance for braking the sleeve. Preferably the chuck is axially adjustably connected to its drive shaft by means of selected shim washers for providing a desired degree of braking.

The tightener apparatus can be easily operated by holding the drill in its natural position with one hand and pressing the tightener with the other hand, thereby causing little risk of dropping the drill. A tightener according to the present invention also does not require precise movement between two objects and does not require substantial hand strength.

In another aspect, the present invention provides a reversible power drill that includes a body and a chuck which is reversibly rotatable with respect to the body. The chuck has a sleeve that is rotatably mounted about a nose of the chuck. The nose is adapted for clamping a drill bit when the bit is tightened in the chuck by inserting the bit into the nose and rotating the nose in relation to the sleeve in one direction of rotation. The drill bit is loosened by rotating the nose with relation to the sleeve in another direction of rotation. The drill also has a braking means and a contact means, similar to those described above.

The braking means can comprise an impact button for impacting the lever when the lever is in its first position at least once for each revolution of the sleeve.

DRAWINGS

These and other features, aspects, and advantages of the present invention will become better understood with reference to the following description, appended claims, and accompanying drawings, where:

FIG. 1 is a side elevational view of a power drill incorporating a chuck tightener according to the present invention, the tightener being in a non-braking position;

FIG. 2 is a partial side view of the chuck and tightener of FIG. 1 wherein the tightener is in a braking position;

FIG. 3 is a fragmentary, sectional side detail view of the drill of FIG. 1 in region 3 of FIG. 1 wherein the chuck is shown rotated to a position opposite to that shown in FIG. 1;

FIG. 4 is a top view of the portion of the drill illustrated in FIG. 3 with the tightener in the braking position as in FIG. 2;

FIG. 5 is a fragmentary side sectional view showing an alternative configuration of the power drill of FIG. 1 within region 3 of FIG. 1;

FIG. 6 is a side elevational view of another embodiment of the power drill wherein the drill chuck tightener is in a non-braking position;

FIG. 7 is a partial side view of the chuck and tightener of FIG. 6 wherein the tightener is in a braking position;

FIG. 8 is an enlarged view of the portion of the drill of FIG. 6 in region 6 of FIG. 6;

FIG. 9 is a top view of the portion of the drill illustrated in FIG. 8 with the tightener in the braking position as in FIG. 7; and FIG. 10 is a fragmentary side sectional detail view of the drill of FIG. 6 within region 10 of FIG. 8.

DESCRIPTION

The present invention is directed to a power drill having a chuck that does not require use of a conventional chuck key. With reference to the drawings, FIG. 1 illustrates a reversible power drill 10 having a body 12 and a chuck 14 for receiving a drill bit 15. The chuck 14 has a sleeve 16 that rotatably encircles a nose 18, within which the bit 15 is enclamped in response to movement of the sleeve 16 relative to the nose 18. As is conventional in the art, the chuck 14 is reversibly rotatable (i.e., rotatable in both directions) with respect to the body 12. The drill 10 also has a handle 20 and a trigger 22.

The power drill 10 reversibly rotates the chuck 14 when the conventional trigger 22 is pressed by the index finger of a user's hand. When a directional switch 24 is changed from a forward position to a reverse position, the drill 10 changes the rotation of the chuck 14 from a first or forward direction of rotation to a second or reverse direction of rotation.

As shown in FIG. 1, the drill 10 has an electrical cord 26 for connection to a conventional external source of electrical power. The drill 10 could also be powered by a battery.

Conventionally, tightening and loosening of the drill bit 15 is accomplished with a chuck key having teeth which mate with slots in the sleeve 16 and nose 18. The drill bit 15 is tightened as illustrated in FIG. 1 or loosened as illustrated in FIG. 2. The drill bit 15 is conventionally tightened in the drill 10 by inserting the bit 15 into the nose 18 and rotating the chuck key for causing the nose 18 to rotate in relation to the sleeve 16 in the first or forward direction of rotation. The bit 15 is loosened by rotating the nose 18 in relation to the sleeve 16 in the second or reverse direction of rotation. The key is then removed from its engagement with the chuck 14.

According to the present invention, the drill 10 has a drill chuck tightener 28 comprising a braking means 30 and a contact means 32, the tightener 28 augmenting or replacing the conventional chuck key. The braking means 30 is attached to the sleeve 16 for braking the sleeve 16 from rotating with respect to the body 12 when the braking means 30 is contacted by the contact means 32 during rotation of the chuck 14. The contact means 32 is movably attached to the body 12 of the drill 10 for contacting or impacting the braking means 30 in a first position of the contact means 32, illustrated in FIGS. 2 and 4. In its first position, the contact means 32 brakes the sleeve 16 in relation to the body 12, producing rotational movement of the sleeve 16 relative to the nose 18 for tightening the drill bit 15 as the nose 18 of the chuck 14 is rotated by the drill 10 in the first or forward direction of rotation. The braking of the sleeve 16 produces an opposite rotational movement of the sleeve 16 in relation to the nose 18 for loosening the bit 15 as the chuck 14 is rotated by the drill 10 in the second or reverse direction of rotation.

In the present invention, the tightener 28 slows the rotation of the sleeve 16 in relation to the rotation of the nose 18 for tightening or loosening the bit 15, depending on the direction of rotation of the chuck 14 as described above. The rotation of the sleeve 16 can be temporarily stopped altogether as the nose 18 continues its rotation if the lever 33 is pressed down with enough force on the impact button 31. However, with the normal force supplied by a user's hand, the rotation of the sleeve 16 is merely slowed, not stopped altogether.

Alternatively, the tightener 28 can be configured for completely stopping the rotation of the sleeve 16 with the use of normal user force levels, such as by providing teeth on the contact means 32 which mate with slots on the sleeve 16 prior to activating the drill. However, in most applications, it is not preferable to stop the rotation of the sleeve completely because the motor of the drill 10 could thereby be overloaded after the drill bit 15 is sufficiently tightened.

In the embodiment of the invention illustrated in FIGS. 1 through 5, the contact means 32 includes a lever 33 and the braking means 30 includes an impact button 31 that is fixably located relative to the sleeve 16. The lever 33 has a contact portion 34, a shank 36, a thumb saddle 38, and a protrusion 40. The contact portion 34 and the thumb saddle 38 are on opposite ends of the lever 33 with the shank 36 therebetween. A protrusion 40 extends from a bottom side of the shank 36.

The tightener 28 also has a lever spring 42 attached between the body 12 of the drill 10 and lever 33 for biasing the lever 33 into its second position. The lever spring 42 compresses to allow the lever 33 to attain its first position when the lever 33 is moved toward the body 12 of the drill 10, as illustrated in FIG. 2.

The lever spring 42 comprises a first helical spring. The protrusion 40 of the lever 33 is inserted within the spring 42 and the body 12 of the drill 10 has a shallow cavity 43 for receiving the protrusion 40 in the first position of the lever 33 illustrated in FIG. 2.

The tightener 28 further has a fulcrum pin 44 attached to the body 12. The pin 44 has a pin axis 46 being in a plane that is perpendicular to an axis of rotation of the chuck 14, designated chuck axis 48 in FIG. 3. The pin 44 is rotatably attached to the lever 33 for rotating the lever 33 about the pin axis 46 between its first and second positions.

The drill chuck tightener 28 can be operated as follows. For tightening the drill bit 15 in the nose 18, the user puts the switch 24 in its forward position. The user then inserts the bit 15 into the loosened chuck 14 and preferably hand tightens the bit in the nose 18 by rotating the sleeve 16. Next, the user grasps the drill 10 by the handle 20 and presses the trigger 22, thereby initiating rotation of the chuck 14 in the first or forward direction. The user then moves the lever 33 toward the body 12 of the drill 10 by pressing the thumb saddle 38. At this point, the lever 33 is in the first position illustrated in FIG. 2. As the chuck 14 rotates, the impact button 31 contacts or impacts the contact portion 34 of the lever 33 once for every revolution of the sleeve 16, thereby braking the rotation of the sleeve 16 in relation to the nose 18. The bit 15 is thereby tightened in the nose 18. Once the bit 15 is tightened, the user releases the lever 33. This allows the spring 42 to move the lever 33 into the second position whereby the contact portion 34 no longer engages the impact button 31.

When it is desired to loosen the bit 15, the switch 24 is put in its reverse position. The steps above for tightening are then repeated with the exception of the step of inserting the bit 15 into the nose 18. After several revolutions of the chuck 14, the loosened bit 15 can be easily removed from the nose 18 of the drill 10.

A standard reversible power drill 10 can be easily modified to install the tightener 28. The chuck 14 can be removed from a drive shaft 49 that extends from the body 12 of the drill 10 for rigidly mounting a support cup 50 onto the sleeve 16, including the impact button 31, as illustrated in FIG. 5. The cup 50 can have a wall thickness on the order of ⅛ inch. The cup 50 can then be permanently and non-rotatably attached to the sleeve 16 by counter-sunk, flat-head screws 52 on opposite sides of the sleeve 16. Two screws 52 are provided for effective support because the sleeve 16 often is formed from separate shell halves. The cup 50 can be attached to the sleeve 16 by alternative means such as by welding, by epoxy adhesive, or by mating slots on the outside of the sleeve 16 with corresponding teeth on the inside of the cup 50.

A small slot 54 can be cut into the front portion of the body 12 of the drill 10 for receiving the lever 33 and a small hole 56 can be drilled laterally through the body 12 to accommodate tee fulcrum pin 44. The lever 33 is inserted into the slot 54 and the pin 44 is slid through the body 12 and the lever 33 during installation of the tightener 28. The slot 54 restrains the lever 33 from rotating in the first and second directions of rotation of the chuck 14. The cavity 43 can also be drilled into the top portion of the body 12 for receiving the protrusion 40 and the lever spring 42. One or more shims 57 are applied to the drive shaft 49 before reinstalling the chuck 14 thereon, for axially adjusting the chuck 14 relative to the contact means 32. Thus a desired amount of braking can be achieved at a full travel position of the contact means 32.

FIGS. 6 through 10 illustrate a reversible power drill 10 having an alternative form of the drill chuck tightener 28, the contact means 32 including a contact post 58. The contact post 58 has a shaft 60, a striker 62 for impacting the impact button 31 to brake the sleeve 16, an inner slot 64 for retaining a post spring 65, and a flat button member 66 for pressing the post 58 down with the user's thumb. A dowel pin 68 slidably protrudes through the slot 64 for supporting the spring 65 and retaining the post 58 in the body 12, the pin 68 being mounted in the body 12 of the drill 10 in a manner similar to the pin 44 of the embodiment of FIGS. 1 through 5.

The post 58 is operated by pressing the button member 66 so that a top portion of the striker 62 contacts the button 31 in the first position of the striker 62 as the sleeve 16 rotates. To release the post 58, the pressure is taken off the top 66, thereby allowing the spring 42 to move the post 58 into the second or non-braking position.

The post 58 operates in a way similar to the lever 33 for tightening the drill 10, except instead of rotating about the fulcrum pin 44 to contact the button 31, as does the lever 33, the post 58 moves radially between its braking and non-braking positions.

In an alternative embodiment of the invention, the lever 33 or post 58 can be replaced by a threaded rod which can be screwed through the body 12 of the drill 10 so that one end of the rod can impact the button 31. The threads on the rod are preferably relatively wide to facilitate movement of the rod for contact with the button 31.

All of the parts of the tightener 28, including the lever 33, the spring 42, the pins 44 and 68, and the post 58 can be made of steel. It is preferable that the impact button 31 be made of an extremely hard steel alloy to reduce wear of that part during impact.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A drill chuck tightener apparatus for a reversible power drill having a body and a chuck reversibly rotatable with respect to the body, the chuck having a nose for receiving a drill bit and a sleeve rotatable about the nose, a drill bit for the drill being tightened in the nose by inserting the bit into the nose and rotating the nose in relation to the sleeve in a first direction of rotation, the drill bit being loosened by rotating the nose in relation to the sleeve in a second direction of rotation, the tightener comprising:
   (a) braking means attached to the sleeve for braking the sleeve from rotating with respect to the nose;
   (b) contact mans movably attached to the body for contacting the braking means in a first position of the contact means, thereby braking the sleeve to tighten the drill bit as the chuck rotates in the first direction of rotation and to loosen the bit as the chuck rotates in the second direction of rotation, the contact means being restrained from movement in the first and second directions of rotation, the contact means being disengaged from the braking means in a second position; and
   (c) means for adjusting a desired level of braking of the braking means.

2. The tightener apparatus of claim 1 wherein the contact means comprises a hand-operable lever.

3. The tightener apparatus of claim 2 further comprising a biasing means attached between the body of the drill and the lever for biasing the lever into the second position and for allowing the lever to be in the first position when an end of the lever opposite a contact end of the lever is moved toward the body of the drill.

4. The tightener apparatus of claim 1 wherein the contact means comprises a contact post having a striker for impacting the braking means.

5. The tightener apparatus of claim 4 comprising a biasing means in an inner slot of the contact post for biasing the post into its non-braking position.

6. The tightener apparatus of claim 1 wherein the braking means comprises an impact button impacting the contact means when the contact means is in the first position at least once for each revolution of the sleeve.

7. The tightener apparatus of claim 2 further comprising a rotation pin attached to the body and having a pin axis in a plane perpendicular to an axis of rotation of the chuck, the rotation pin being attached to the lever for permitting rotation the lever about the pin axis into the first and second positions of the lever.

8. The tightener apparatus of claim 3 wherein the biasing means comprises a spring.

9. The tightener apparatus of claim 8 wherein the spring is helical and the lever comprises a protrusion inserted within the spring, the body of the drill having a hole for receiving the protrusion in the first position of the lever.

10. The tightener apparatus of claim 5 wherein the biasing means comprises a helical spring.

11. The tightener apparatus of claim 1 wherein the braking means and the sleeve are integral with each other.

12. The tightener apparatus of claim 2 wherein the lever has a thumb saddle at its end opposite the contact end.

13. The tightener apparatus of claim 1, wherein the chuck is connected to a drive shaft of the power drill, and the means for adjusting a desired level of braking comprises at least one shim washer for locating between the chuck and a shoulder of the drive shaft for adjusting an axial position of the chuck on the drive shaft.

14. A reversible power drill comprising:
(a) a body;
(b) a chuck reversibly rotatable with respect to the body, the chuck having a sleeve rotatable about a nose of the chuck, the nose being adapted for receiving a drill bit therein, the bit being tightened in the drill by rotating the nose in relation to the sleeve in a first direction of rotation, the bit being loosened by rotating the nose in relation to the sleeve in an opposite second direction of rotation; and
(c) a drill chuck tightener comprising:
 (i) braking means attached to the sleeve for braking the sleeve from rotating with respect to the nose, the braking means including an impact button; and
(d) contact means movably attached to the body for contacting the braking means in a first position of the contact means, thereby braking the sleeve to tighten the drill bit as the chuck rotates in the first direction of rotation and to loosen the drill bit as the chuck rotates in the second direction of rotation, the impact button impacting the contact means when the contact means is in the first position at least one for each revolution of the sleeve, the contact means being restrained from movement in the first and second directions of rotation, the contact means being disengaged from the braking means in a second position.

15. The power drill of claim 14 wherein the contact means comprises a lever and wherein the tightener further comprises a biasing means attached between the body of the drill and the lever for biasing the lever into the second position and for allowing the lever to be in the first position when an end of the lever opposite a contact end of the lever is moved toward the body of the drill.

16. The power drill of claim 14 wherein the contact means comprises a contact post having a striker for impacting the braking means and the tightener further comprises a biasing means in an inner slot of the contact post for biasing the post into its non-braking position.

17. The tightener apparatus of claim 14 wherein the chuck is connected to a drive shaft of the power drill, the apparatus further comprising means for adjusting a desired level of braking, comprising at least one shim washer for locating between the chuck and a shoulder of the drive shaft for adjusting an axial position of the chuck on the drive shaft.

18. A drill chuck tightener apparatus for a reversible power drill having a body and a chuck reversibly rotatable with respect to the body, the chuck having a sleeve rotatable about a nose, the drill bit being tightened in the nose by rotating the nose in relation to the sleeve in a first direction of rotation, the drill bit being loosened by rotating the nose in relation to the sleeve in an opposite second direction of rotation, the tightener comprising:
(a) an impact button attached to the sleeve for braking the sleeve from rotating with respect to the nose;
(b) contact means movably attached to the body of the drill for contacting the impact button in a first position of the contact means thereby braking the sleeve to tighten the drill bit as the chuck rotates in the first direction of rotation and to loosen the drill bit as the chuck rotates in the second direction of rotation, the contact means being restrained from movement in the first and second directions of rotation, the contact means being disengaged from the impact button in a second position; and
(c) a helical spring for biasing the contact means into the second position and for allowing the contact means to be in the first position when the contact means is pressed toward the body of the drill, the button impacting the contact means when the contact means is in the first position at least once for every revolution of the sleeve.

19. The apparatus of claim 18 wherein the contact means comprises a lever.

20. The apparatus of claim 18 wherein the contact means comprises a contact post.

* * * * *